US007090134B2

(12) United States Patent
Ramsager

(10) Patent No.: US 7,090,134 B2
(45) Date of Patent: Aug. 15, 2006

(54) SYSTEM FOR PROJECTING A HANDLING INSTRUCTION ONTO A MOVING ITEM OR PARCEL

(75) Inventor: Thomas Ramsager, Roswell, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 187 days.

(21) Appl. No.: 10/793,045

(22) Filed: Mar. 4, 2004

(65) Prior Publication Data

US 2004/0195320 A1 Oct. 7, 2004

Related U.S. Application Data

(60) Provisional application No. 60/451,999, filed on Mar. 4, 2003.

(51) Int. Cl.
*G06K 7/10* (2006.01)
*G06K 15/00* (2006.01)

(52) U.S. Cl. .................................. 235/462.13; 235/454

(58) Field of Classification Search ........... 235/462.13, 235/462.42, 454; 209/583
See application file for complete search history.

(56) References Cited

U.S. PATENT DOCUMENTS

| | | | |
|---|---|---|---|
| 3,576,368 | A | 4/1971 | Goetz |
| 3,783,295 | A | 1/1974 | Casler |
| 3,802,548 | A | 4/1974 | Wentz et al. |
| 4,268,165 | A | 5/1981 | Bradmon |
| 4,348,097 | A | 9/1982 | Sippel |
| 4,498,744 | A | 2/1985 | Ealovega et al. |
| 4,515,455 | A | 5/1985 | Northmore |
| 4,544,064 | A | 10/1985 | Felder |
| 4,597,495 | A | 7/1986 | Knosby |
| 4,615,446 | A | 10/1986 | Pavie |
| 4,649,504 | A | 3/1987 | Krouglicof et al. |
| 4,711,357 | A | 12/1987 | Langenbeck et al. |
| 4,736,109 | A | 4/1988 | Dvorzsak |
| 4,760,247 | A | 7/1988 | Keane et al. |
| 4,776,464 | A | 10/1988 | Miller et al. |
| 4,788,596 | A | 11/1988 | Kawakami et al. |

(Continued)

FOREIGN PATENT DOCUMENTS

EP 0330184 A2 8/1989

(Continued)

OTHER PUBLICATIONS

Yamada Yasuo, Inventor; Nippondenso Co. Ltd, Applicant; "Optical Information Reader [Abstract Only]," Patent Abstracts of Japan, Publication Date Aug. 9, 1996, Publication No. 0820 2806 (Abstracts published by the European Patent Office on Dec. 26, 1996, vol. 1996, No. 12).

(Continued)

*Primary Examiner*—Thien M. Le
*Assistant Examiner*—Lisa M. Caputo
(74) *Attorney, Agent, or Firm*—Alston & Bird LLP

(57) ABSTRACT

The invention includes a system for projecting a display onto an item or parcel using an acquisition device to capture indicia on each parcel, a tracking system, a controller or computer to select the display based on the indicia, and one or more display projectors. In one embodiment the display includes or connotes a handling instruction. The system in one embodiment includes a laser projection system to paint the selected display directly onto a selected exterior surface of the corresponding parcel, for multiple parcels simultaneously. The system may be configured to move each display in order follow each moving parcel so that each display remains legible to a viewer in a display zone where handling takes place.

21 Claims, 5 Drawing Sheets

U.S. PATENT DOCUMENTS

| | | | | |
|---|---|---|---|---|
| 4,805,778 | A | 2/1989 | Nambu | |
| 4,832,204 | A | 5/1989 | Handy et al. | |
| 4,874,936 | A | 10/1989 | Chandler et al. | |
| 4,877,949 | A | 10/1989 | Danielson et al. | |
| 4,896,029 | A | 1/1990 | Chandler et al. | |
| 4,992,649 | A | 2/1991 | Mampe et al. | |
| 5,003,300 | A | 3/1991 | Wells | |
| 5,095,204 | A | 3/1992 | Novini | |
| 5,101,983 | A | 4/1992 | Scata | |
| 5,115,121 | A | 5/1992 | Bianco et al. | |
| 5,128,528 | A | 7/1992 | Heminger | |
| 5,140,141 | A | 8/1992 | Inagaki et al. | |
| 5,141,097 | A | 8/1992 | Oiry et al. | |
| 5,165,520 | A | 11/1992 | Hervé et al. | |
| 5,185,822 | A | 2/1993 | Miura | |
| 5,190,162 | A | 3/1993 | Hartlepp | |
| 5,208,449 | A | 5/1993 | Eastman et al. | |
| 5,245,172 | A | 9/1993 | Esslinger et al. | |
| 5,281,957 | A | 1/1994 | Schoolman | |
| 5,305,244 | A | 4/1994 | Newman et al. | |
| 5,308,960 | A | 5/1994 | Smith et al. | |
| 5,309,190 | A | 5/1994 | Shinohara et al. | |
| 5,311,999 | A | 5/1994 | Malow et al. | |
| 5,323,327 | A | 6/1994 | Carmichael et al. | |
| 5,327,171 | A | 7/1994 | Smith et al. | |
| 5,329,469 | A | 7/1994 | Watanabe | |
| 5,353,091 | A | 10/1994 | Ishida et al. | |
| 5,380,994 | A | 1/1995 | Ray | |
| 5,431,288 | A | 7/1995 | Nishijima et al. | |
| 5,450,596 | A | 9/1995 | Felsenstein | |
| 5,463,432 | A | 10/1995 | Kahn | |
| 5,481,096 | A | 1/1996 | Hippenmeyer et al. | |
| 5,481,298 | A | 1/1996 | Sasaki et al. | |
| 5,485,263 | A | 1/1996 | Bjorner et al. | |
| 5,491,510 | A | 2/1996 | Gove | |
| 5,506,912 | A | 4/1996 | Nagasaki et al. | |
| 5,510,603 | A | 4/1996 | Hess et al. | |
| 5,515,447 | A | 5/1996 | Zheng et al. | |
| 5,566,245 | A | 10/1996 | Zheng et al. | |
| 5,567,927 | A | 10/1996 | Kahn et al. | |
| 5,607,187 | A | 3/1997 | Salive et al. | |
| 5,620,102 | A | 4/1997 | Finch, Jr. | |
| 5,642,442 | A | 6/1997 | Morton et al. | |
| 5,667,078 | A | 9/1997 | Walach | |
| 5,671,158 | A | 9/1997 | Fournier et al. | |
| 5,677,834 | A | 10/1997 | Mooneyham | |
| 5,682,030 | A | 10/1997 | Kubon | |
| 5,687,850 | A | 11/1997 | Speckhart et al. | |
| 5,695,071 | A | 12/1997 | Ross et al. | |
| 5,697,504 | A | 12/1997 | Hiramatsu et al. | |
| 5,699,440 | A | 12/1997 | Carmeli | |
| 5,725,253 | A | 3/1998 | Salive et al. | |
| 5,742,263 | A | 4/1998 | Wang et al. | |
| 5,770,841 | A | 6/1998 | Moed et al. | |
| 5,812,257 | A | 9/1998 | Teitel et al. | |
| 5,844,601 | A | 12/1998 | McPheely et al. | |
| 5,844,824 | A | 12/1998 | Newman et al. | |
| 5,857,029 | A | 1/1999 | Patel | |
| 5,869,820 | A | 2/1999 | Chen et al. | |
| 5,900,611 | A | 5/1999 | Hecht | |
| 5,920,056 | A | 7/1999 | Bonnet | |
| 5,923,017 | A | 7/1999 | Bjorner et al. | |
| 5,933,479 | A | 8/1999 | Michael et al. | |
| 5,943,476 | A | 8/1999 | Dougherty et al. | |
| 5,959,611 | A | 9/1999 | Smailagic et al. | |
| 6,046,712 | A | 4/2000 | Beller et al. | |
| 6,060,992 | A | 5/2000 | Huang et al. | |
| 6,061,644 | A | 5/2000 | Leis | |
| 6,064,354 | A | 5/2000 | DeLuca | |
| 6,064,476 | A | 5/2000 | Goltsos | |
| 6,064,749 | A | 5/2000 | Hirota et al. | |
| 6,085,428 | A | 7/2000 | Casby et al. | |
| 6,094,509 | A | 7/2000 | Zheng et al. | |
| 6,094,625 | A | 7/2000 | Ralston | |
| 6,114,824 | A | 9/2000 | Watanabe | |
| 6,122,410 | A | 9/2000 | Zheng et al. | |
| 6,148,249 | A | 11/2000 | Newman | |
| 6,172,657 | B1 | 1/2001 | Kamakura et al. | |
| 6,189,784 | B1 | 2/2001 | Williams et al. | |
| 6,204,764 | B1 | 3/2001 | Maloney | |
| 6,236,735 | B1 | 5/2001 | Bjorner et al. | |
| 6,243,054 | B1 | 6/2001 | DeLuca | |
| 6,243,620 | B1 | 6/2001 | Robinson et al. | |
| 6,244,015 | B1 | 6/2001 | Ito et al. | |
| 6,282,462 | B1 | 8/2001 | Hopkins | |
| 6,317,039 | B1 | 11/2001 | Thomason | |
| 6,330,356 | B1 | 12/2001 | Sundareswaran et al. | |
| 6,342,915 | B1 | 1/2002 | Ozaki et al. | |
| 6,352,349 | B1 | 3/2002 | Braginsky et al. | |
| 6,353,313 | B1 | 3/2002 | Estep et al. | |
| 6,377,401 | B1 | 4/2002 | Bartlett | |
| 6,411,266 | B1 | 6/2002 | Maguire, Jr. et al. | |
| 6,417,969 | B1 | 7/2002 | DeLuca et al. | |
| 6,437,823 | B1 | 8/2002 | Zhang | |
| 6,445,175 | B1 | 9/2002 | Estep et al. | |
| 6,714,121 | B1 | 3/2004 | Moore | |
| 6,808,114 | B1 * | 10/2004 | Palestini et al. | 235/454 |
| 6,878,896 | B1 * | 4/2005 | Braginsky et al. | 209/583 |
| 6,913,202 | B1 * | 7/2005 | Tsikos et al. | 235/472.01 |
| 2001/0032805 | A1 | 10/2001 | Lawandy et al. | |
| 2001/0033685 | A1 | 10/2001 | Parry | |
| 2001/0042055 | A1 * | 11/2001 | Didriksen et al. | 705/407 |
| 2002/0063159 | A1 | 5/2002 | Wilz, Sr. et al. | |
| 2002/0075201 | A1 | 6/2002 | Sauer et al. | |
| 2002/0082498 | A1 | 6/2002 | Wendt et al. | |
| 2002/0105484 | A1 | 8/2002 | Navab et al. | |
| 2002/0113756 | A1 | 8/2002 | Tuceryan et al. | |
| 2003/0034392 | A1 | 2/2003 | Grimm et al. | |
| 2003/0083076 | A1 | 5/2003 | Pradhan et al. | |
| 2003/0106771 | A1 | 6/2003 | Takizawa | |
| 2004/0004119 | A1 | 1/2004 | Baldassari et al. | |
| 2004/0008113 | A1 | 1/2004 | Pradhan et al. | |
| 2004/0016684 | A1 | 1/2004 | Braginsky et al. | |
| 2004/0148518 | A1 | 7/2004 | Grundback et al. | |
| 2004/0150387 | A1 | 8/2004 | Lyon et al. | |
| 2004/0153539 | A1 | 8/2004 | Lyon et al. | |
| 2004/0178269 | A1 | 9/2004 | Pradhan et al. | |
| 2004/0178270 | A1 | 9/2004 | Pradhan et al. | |

FOREIGN PATENT DOCUMENTS

| | | | |
|---|---|---|---|
| EP | 1 128 315 | A1 | 8/2001 |
| FR | 2 676 941 | A1 | 12/1992 |
| JP | 56004870 | A2 | 1/1981 |
| WO | WO 98/32545 | | 7/1998 |
| WO | WO 00/52563 | | 9/2000 |
| WO | WO 00/59648 | | 10/2000 |
| WO | WO 00/59649 | | 10/2000 |
| WO | WO 03/050626 | A1 | 6/2003 |

OTHER PUBLICATIONS

International Search Report for International Application No. PCT/US 2004/006735.

IBM Corp.; "Parcel Positioning, Scanning, and Sorting System;" IBM Technical Disclosure Bulletin, vol. 15, No. 4, Sep. 1972, pp. 1170-1171.

VERBEX.COM; "Verbex Speech Commander™ Portable . . . Continuous Speech Recognizer for Mobile Computing;" Product Features and Specifications; 3 pages.

Michel, Circuit Judge; *Winner Int'l Royalty Corp. v. Wang*; 202 F.3d 1340, 53 U.S.P.Q.2d 1580 (No. 98-1553, Fed. Cir., Jan. 27, 2000); 12 pages.

Susan Kuchinskas; HP: Sensor Networks Next Step for RFID; Internetnews.com; http://www.internetnews.com/ent-news/article.php/3426551; Oct. 26, 2004; pp. 1-4. Accessed Mar. 16, 2005. Applicant makes no admission that this reference constitutes prior art.

International Searching Authority; International Search Report and Written Opinion; dated Jun. 1, 2005; regarding International Application No. PCT/US2005/003779 (European Patent Office).

Jaeyong Chung et al., Postrack: A Low Cost Real-Time Motion Tracing System for VR Application, 2001, pp. 383-392, IEEE Computer Society, USA.

International Search Report from International Application No. PCT/US2004/043264 dated Sep. 21, 2005.

* cited by examiner

SYSTEM FOR PROJECTING A HANDLING INSTRUCTION ONTO A MOVING ITEM OR PARCEL

CROSS-REFERENCE TO RELATED APPLICATIONS

This application claims the benefit and priority of a U.S. provisional application for patent filed Mar. 4, 2003, and assigned application Ser. No. 60/451,999, which is incorporated herein by reference in its entirety.

BACKGROUND

1. Technical Field

The following disclosure relates generally to the field of handling, tracking, and processing of items. More particularly, the present invention provides a system and method for tracking the movement of items or parcels in a work area and displaying a handling instruction for each parcel.

2. Description of Related Art

The process of sorting items or parcels bound for a variety of destinations throughout the world typically involves several sorting steps. A preliminary sort may be followed by several intermediate sorts, intermediate transport steps by air or rail or feeder truck, and additional sorting at one or more intermediate hub facilities before a parcel is placed in a vehicle such as a package car for delivery to the final destination. The task of sorting and processing multiple items or parcels involves a variety of technical and logistical challenges.

Modern sorting systems may use a complex system of conveyors to sort incoming parcels into a variety of sectors based upon a particular characteristic, such as a delivery destination or zip code. The particular characteristic for each parcel may be indicated or displayed on the parcel using indicia. Indicia may include printed text on a label, codes or abbreviations printed on a label, data encoded in a symbol or tag, or any of a variety of other methods.

Although parcel sorting has been greatly improved through the use of modern technologies such as code readers and computer-controlled conveyor systems, the sorting process still requires a knowledgeable and attentive labor force to coordinate and track the parcels during sorting. The sorting environment may be described as dynamic and busy, where personnel experience a constant barrage of various stimuli requiring quick decision-making and physical activity. Items or parcels may be moved between various zones in a facility using a flexible array of conveying segments such as conveyor belts, slides, chutes, trays, bags, or carts.

Large-scale item processors may have a substantial investment in the numerous facilities, plant equipment configurations, and training required to meet its sorting and handling needs. Often, the user of new technology is hampered by the high cost of inserting technology into existing manual systems, physical space constraints, and the expense of varying an existing flow of items or parcels in a facility or processing environment.

In many existing sorting systems, each intermediate sort may require a separate handling instruction on a label applied to the parcel. Some systems may print a handling instruction in ink directly onto the parcel during each intermediate sort. The repeated processing and labeling of a parcel during multiple sorts represents a significant cost and creates a risk of error during every step. Often, the text on a printed label is somewhat small and difficult to read. The font size on the label may be limited by the anticipated use of multiple sorting labels on a single parcel, causing time delays and limiting sorter efficiency.

The additional time and costs associated with applying an additional label for every intermediate handling instruction represents a significant barrier to efficiency and profitability in the parcel sorting and loading process. Multiple sort labels may lead to confusion and incorrect sorting. The costs of applying a label include paper and ink, a printing device, and a printing station at every location where a label is needed. Adding a printing station typically consumes valuable floor space in a sorting facility that may already have limited space. Also, additional personnel are typically required to monitor the proper functioning of a label applicator. Most label printing systems typically cause periodic and recurring delays due to printer malfunctions, duplicate or overlapping labels, non-sticking labels, inaccurate labeling, as well as routine printer maintenance. These tasks created by the use of multiple labels impose a considerable expense on the sorting process. The label printing step also introduces a time delay during each and every intermediate sort process which, for large batches of parcels, can amount to a significant increase in processing time.

Thus, there exists a need in the art for a system for applying a handling instruction to each of a plurality of parcels or items, while meeting the efficiency objectives of a modern sorting and handling facility. There is also a need for an apparatus that can apply the handling instruction without delaying the process. A related need exists for developing a low-maintenance system that requires little or no skilled supervision. Finally, there exists a need for a comprehensive system for applying a handling instruction to each parcel or item quickly, accurately, and with minimal supervision.

Certain illustrative and exemplary systems, methods, and apparatuses are described herein in connection with the following description and the accompanying drawing figures. The examples discussed represent only a few of the various ways of applying the principles supporting the material disclosed and, thus, the examples are intended to include equivalents. Other advantages and novel features may become apparent from the detailed description which follows, when considered in conjunction with the drawing figures.

SUMMARY OF THE INVENTION

The following summary is not an extensive overview and is not intended to identify key or critical elements of the apparatuses, methods, systems, processes, and the like, nor is it intended to delineate the scope of such elements. This Summary provides a conceptual introduction in a simplified form as a prelude to the more-detailed description that follows.

The example methods, products, and systems described herein facilitate the handling, tracking, and processing of items or parcels moving through a facility or work area.

In one aspect of the present invention, a system for processing one or more items may include an acquisition device to capture indicia about an item, one or more projectors positioned near a display zone where the item may be processed, and a controller in communication with the acquisition device and the one or more projectors, wherein the controller receives the indicia from the acquisition device, selects a display based upon the indicia, and sends the display to the one or more projectors. The one or more projectors may be positioned to project the display adjacent the item.

The indicia may include an optical code and the acquisition device may include an optical scanner. The indicia may include a bar code and the acquisition device may include a bar code scanner. The indicia may include an RFID tag and the acquisition device may include an RFID reader.

The projectors may be positioned to project the display onto on one or more exterior surfaces of the item. Also, the projectors may be configured to select a most visible surface relative to a viewer located within the display zone, and the projectors may be positioned to project the display onto the most visible surface. The one or more projectors may include a laser projection system.

The controller may include a computer with memory and a database for storing the indicia.

The display may be configured to communicate a handling instruction to a viewer of the display. The display may be selected from a set of standard displays.

In the system, where the item may be moving along a path generally toward the display zone, the system may also include a tracking system to capture a plurality of locations and corresponding times for the item, and the tracking system may include one or more tracking cameras. In such a system, the controller may be further configured to (1) select as a current location the most recent one of the plurality of locations and (2) direct the one or more projectors to project the display adjacent the item at the current location, such that the display follows the item along the path. The plurality of locations may include item coordinates relative to an established system of coordinates, an angular orientation relative to the established system of coordinates, and dimensional data about the item.

In another aspect of the system, the controller may be further configured to (1) receive the plurality of locations and corresponding times; (2) compare the item coordinates to a fixed location of the display zone; and (3) send a start signal to the one or more projectors when the item coordinates fall within the fixed location of the display zone, the start signal configured to prompt the one or more projectors to project the display. The controller may be further configured to select as a current orientation the most recent one of the angular orientations, and direct the one or more projectors to project the display adjacent the item at the current orientation, such that the display follows the item along the path and remains legible.

In another aspect of the present invention, a method may be provided for processing a plurality of items. The method may include the steps of (a) acquiring indicia about an item in the plurality of items; (b) capturing an item location for the item; (c) selecting a display based upon the indicia; (d) projecting the display adjacent the item; and (e) repeating steps (a) through (d) for a subsequent item in the plurality of items.

The step of acquiring indicia may include providing an acquisition device configured to read the indicia. The step of projecting the display may include projecting the display onto one or more exterior surfaces of the item. The step of projecting the display may also include selecting a most visible surface relative to a viewer located within the display zone, and projecting the display onto the most visible surface.

In one aspect, the method may also include projecting one or more of the displays simultaneously.

The step of projecting the display may also include communicating a handling instruction to a viewer of the display. The step of selecting a display may also include providing a set of standard displays, and selecting the display from the set.

In another aspect, the step of capturing an item location may also include: (1) capturing one or more intermediate locations of the item as it moves along a path generally toward a display zone; (2) storing each of the one or more intermediate locations; (3) selecting as a current location the most recent one of the one or more intermediate locations; (4) comparing the current location to a fixed location of the display zone; and (5) executing the step of projecting the display when the current location falls within the fixed location of the display zone. The step of capturing an item location may also include projecting the display adjacent the item at the current location, such that the display follows the item along the path and remains legible.

These and other objects are accomplished by the methods, products, and systems described herein and will become apparent from the following description of a preferred embodiment in conjunction with the accompanying drawings in which like numerals designate like elements.

BRIEF DESCRIPTION OF THE DRAWING

The invention may be more readily understood by reference to the following description, taken with the accompanying drawing figures, in which.

DETAILED DESCRIPTION

Figure 1:
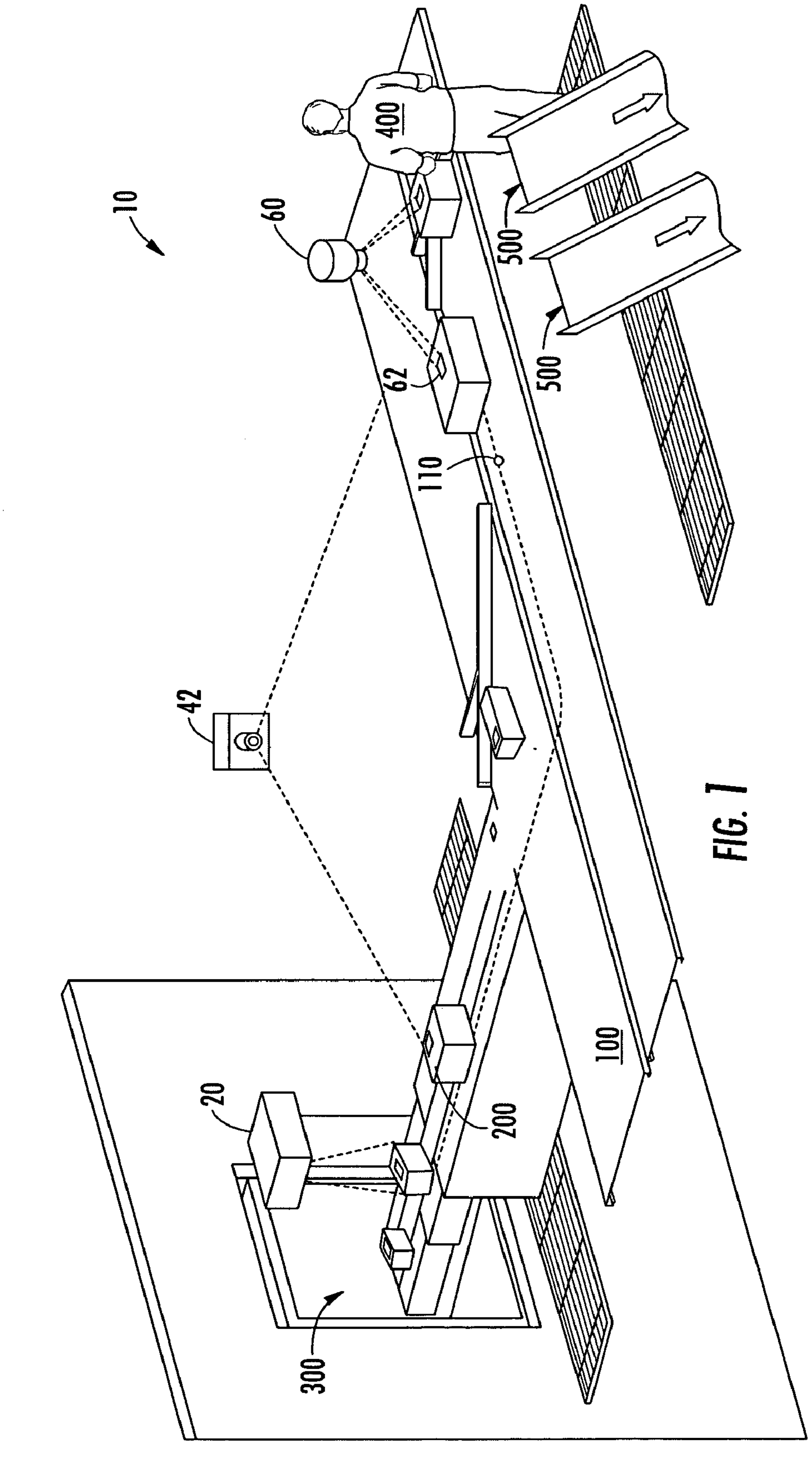
FIG. 1 is a perspective illustration of a tracking and display system, according to one embodiment of the present invention.

This application claims the benefit and priority of a U.S. provisional application for patent filed Mar. 4, 2003, and assigned application Ser. No. 60/451,999, which is incorporated herein by reference in its entirety.

1. Introduction

Exemplary systems, methods, and apparatuses are now described with reference to the drawing figures, where like reference numerals are used to refer to like elements throughout the several views. In the following description, for purposes of explanation, numerous specific details are set forth in order to facilitate a thorough understanding of the systems, methods, apparatuses, and the like. It may be evident, however, that the exemplars described may be practiced without these specific details. In other instances, common structures and devices are shown in block diagram form in order to simplify the description. Indeed, this invention may be embodied in many different forms and should not be construed as limited to the embodiments set forth herein; rather, these embodiments are provided so that this disclosure will satisfy applicable legal requirements.

The embodiments of the present invention may be described below with reference to block diagrams and flow chart illustrations of systems, methods, apparatuses, and computer program products according to an embodiment of the invention. It will be understood that each block of the block diagrams and flow chart illustrations, and combinations of blocks in the block diagrams and flow chart illustrations, respectively, may be implemented by computer program instructions. These computer program instructions may be loaded onto a general-purpose computer, special-purpose computer, or other programmable data processing apparatus to product a machine, such that the instructions that execute on the computer or other programmable data processing apparatus create means for implementing the functions specified in the flow chart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flow chart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flow chart block or blocks.

Accordingly, blocks of the block diagrams and flow chart illustrations support combinations of means for performing the specified functions, combinations of steps for performing the specified functions and program instruction means for performing the specified functions. It will also be understood that each block of the block diagrams and flow chart illustrations, and combinations of blocks in the block diagrams and flow chart illustrations, can be implemented by special purpose hardware-based computer systems that perform the specified functions or steps, or combinations of special purpose hardware and computer instructions.

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, object oriented, and/or artificial intelligence techniques.

The processing, analyses, and/or other functions described herein may also be implemented by functionally equivalent circuits like a digital signal processor circuit, a software controlled microprocessor, or an application specific integrated circuit. Components implemented as software are not limited to any particular programming language. Rather, the description herein provides the information one skilled in the art may use to fabricate circuits or to generate computer software to perform the processing of the system. It will be appreciated that some or all of the functions and/or behaviors of the present system and method may be implemented as logic as defined above.

Many modifications and other embodiments may come to mind to one skilled in the art who has the benefit of the teachings presented in the description and drawings. It should be understood, therefore, that the invention is not be limited to the specific embodiments disclosed and that modifications and alternative embodiments are intended to be included within the scope of the disclosure and the exemplary inventive concepts. Although specific terms may be used herein, they are used in a generic and descriptive sense only and not for purposes of limitation.

2. Definitions

As used in this application, the term "singulated" refers to a series of items or parcels positioned in a single-file line, one after the other. The handling of items or parcels may be greatly simplified by converting a flow of overlapping items crowded together (non-singlulated) into a stream of singulated items to be processed. In a conveying system where items or parcels are moving through a facility or work area, a specialized conveyor or singulator may be used to produce a singulated flow.

As used in this application, the term "display" when used as a noun refers to a presentation, an exhibit or showing by which information is conveyed to a viewer or operator.

As used in this application, the term "computer component" refers to a computer-related entity, either hardware, firmware, software, a combination thereof, or to software in execution. For example, a computer component can be, but is not limited to being, a server, a processor, a process running on a processor, an object, an executable, a thread of execution, a program, and a computer. By way of illustration, both an application running on a server and the server itself can be a computer component. One or more computer components cans reside within a process and/or thread of execution and a computer component can be localized on a single computer and/or distributed between and among two or more computers.

"Software," as used herein, includes but is not limited to, one or more computer readable and/or executable instructions that cause a computer, computer component and/or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel-processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer or programmer or the like.

"Database," as used herein, refers to a physical and/or logical entity that can store data. A database may be, for example, a stand-alone database, a relational database, a set of relational databases, a table, a file, a list, a queue, a heap, and so on. A database may reside in one logical and/or physical entity and/or may be distributed between two or more logical and/or physical entities.

The systems, methods, apparatuses, and objects described herein may be stored, for example, on a computer readable media. Media may include, but are not limited to, an ASIC, a CD, a DVD, a RAM, a ROM, a PROM, a disk, a carrier wave, a memory stick, and the like. Thus, an example computer readable medium can store computer executable instructions for a method for managing transportation assets.

The method includes planning a route for a transportation asset based on the analysis of data retrieved from an experience-based route database.

To the extent that the term "includes" is employed in the detailed description or the list of exemplary inventive concepts, it is intended to be inclusive in a manner similar to the term "comprising" as that term is interpreted when employed as a transitional word in a claim. Further still, to the extent that the term "or" is employed in the list of exemplary inventive concepts (for example, A or B) it is intended to mean "A or B or both." When the author intends to indicate "only A or B but not both," the author will employ the phrase "A or B but not both." Thus, use of the term "or" herein is the inclusive use, not the exclusive use. See Bryan A. Garner, A Dictionary Of Modern Legal Usage 624 (2d ed. 1995).

3. System Components

Figure 4:
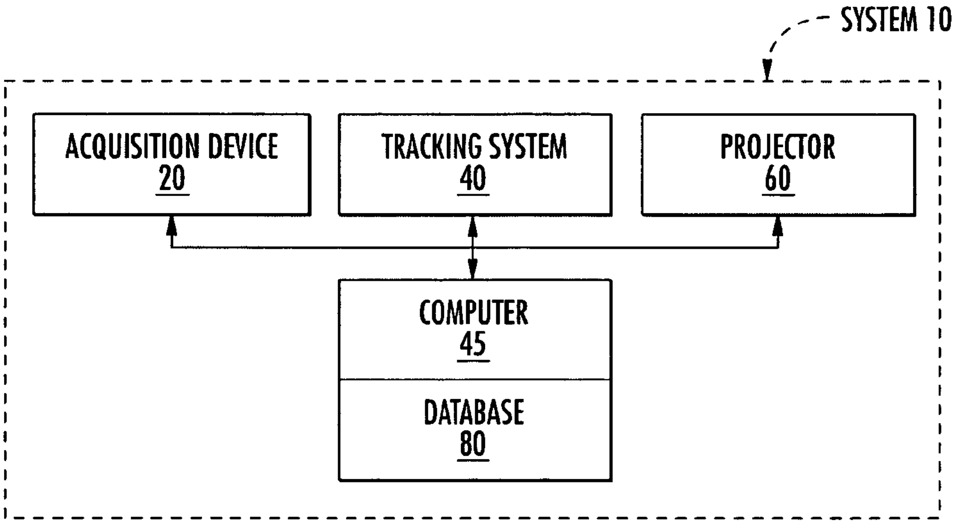
FIG. 4 is a schematic diagram of a tracking and display system, according to one embodiment of the present invention.

Generally, the various embodiments of the present invention relate to systems and methods for tracking the movement of items or parcels within a work area and displaying a handling instruction for each item or parcel. The present invention may be used for processing either singulated or non-singulated items. FIG. 4 is a schematic diagram of a system according to one embodiment of the present invention. The system 10 may include a controller or computer 45 linked to one or more scanners or acquisition devices 20, tracking systems 40, and projectors 60. As shown, the computer 45 may include a memory component and a database 80. The controller or computer 45 may also include a programmable logic controller (PLC) or other control system capable of monitoring and providing communication between the components described herein. Each link illustrated between the components represents a line of communication capable of transmitting data, messages, input, output, and the like.

Figure 3:
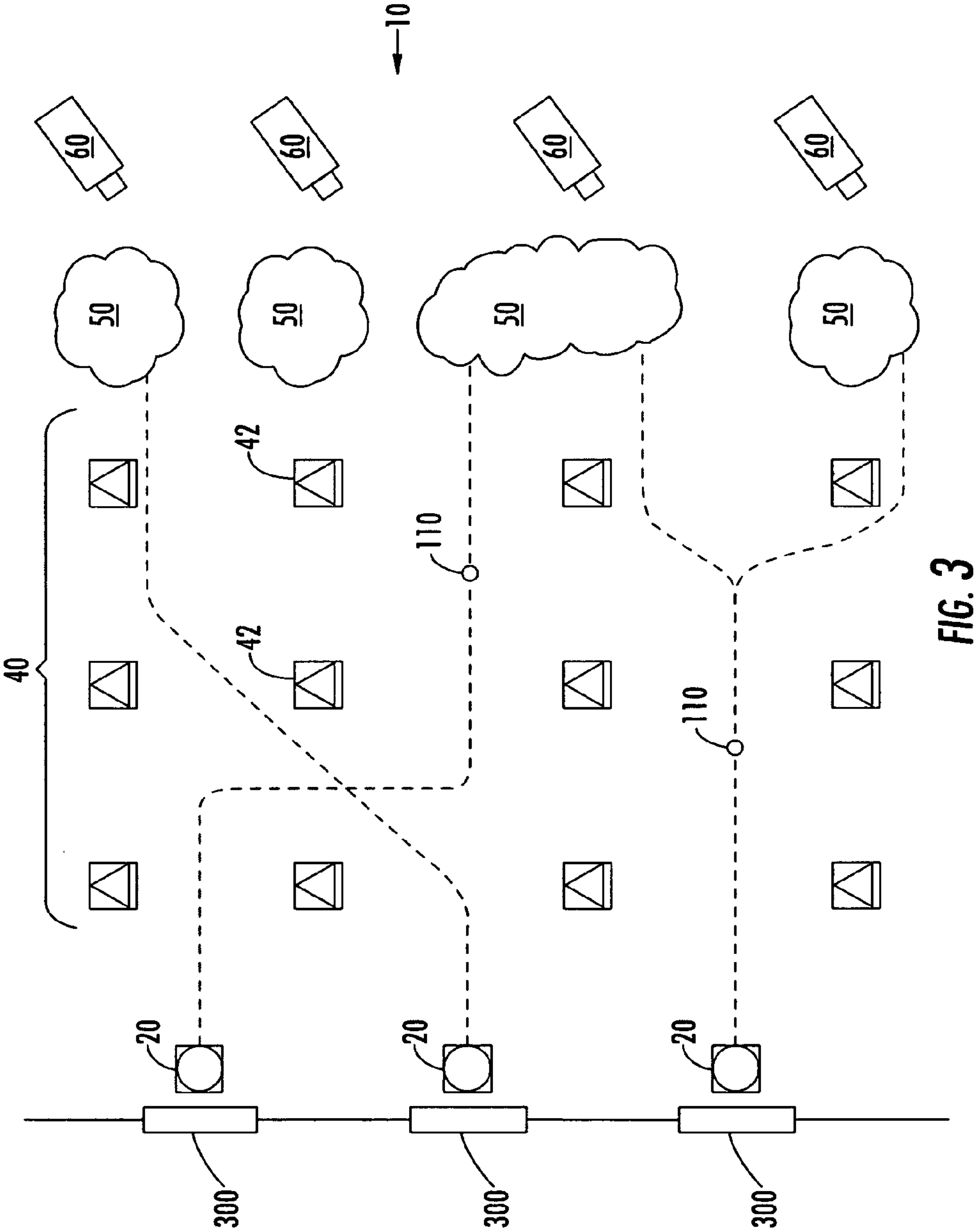
FIG. 3 is an overhead schematic layout of a tracking and display system, according to one embodiment of the present invention.

FIG. 3 is an overhead schematic layout of a system 10 according to one embodiment of the present invention. As shown, the system 10 may include one or more acquisition devices 20 positioned at or near various portals 300 where parcels enter the work area or facility. The tracking system 40 may include an array of tracking cameras 42 strategically located to cover the entire area. The dotted lines represent the path 110 traveled by parcels through work area. Each path 110 generally begins at the portal 300 and ends at or near a display zone 50, where each parcel is handled or processed. The projectors 60 may be configured to project a display 62 near or onto each parcel when it is located in or near the display zone 50.

Figure 2:
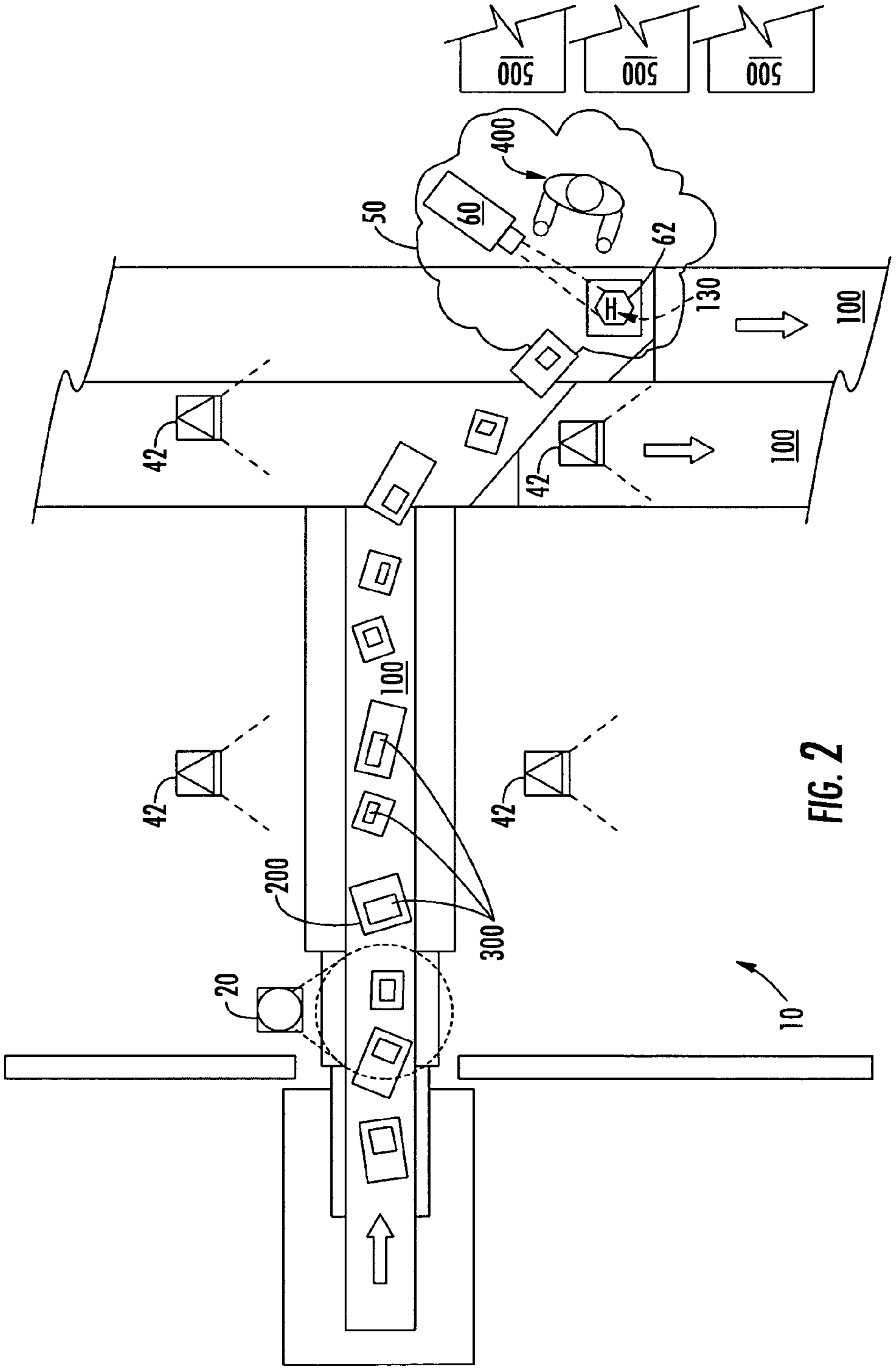
FIG. 2 is an overhead illustration of a tracking and display system, according to one embodiment of the present invention.

FIG. 2 is an overhead illustration of a system 10 according to one embodiment of the present invention. As shown, the system 10 may include an acquisition device 20, an array of tracking cameras 42, and one or more projectors 60. Each item or parcel 200 may include a label or other indicia 30. In one embodiment, the display 62 chosen to be projected onto each parcel 200 is correlated to the data contained in the indicia 30, so the display 62 matches the indicia 30 for each particular parcel 200. In one embodiment, the display 62 appears when each parcel 200 is located within or near a display zone 50. As shown, the display 62 (depicted in the shape of a hexagon) may include a handling instruction 130 (depicted by the letter H), directing the viewer 400 to process the parcel 200, for example, by moving the parcel 200 to a particular segment 500.

FIG. 1 is a perspective illustration of a system 10 according to one embodiment of the present invention. As shown, the system 10 may include an acquisition device 20, a tracking camera 42, and a projector 60. The system 10 may include one or more acquisition devices 20 at one or more portals 300 where information is acquired about one or more items or parcels 200 as they enter a work area or facility. The system 10 may include one or more tracking cameras 42 as part of a tracking system 40 (FIG. 3) configured to fix, track, and follow the location of each item or parcel 200 as it moves through a facility. In one embodiment, the parcels 200 may move along a general path 110 using, for example, a series of conveyors 100. The system 10 may include one or more projectors 60 configured to project a display 62 onto the surface of each parcel 200. The projector 60 may also be configured to move the display 62 such that it follows each parcel 200 in motion and the display 62 remains legible to a viewer 400. In response to the display 62, the viewer 400 may be instructed to process the item or parcel 200, for example, by moving the parcel 200 to a particular segment 500 selected from among a number of available segments 500. A segment 500 may be a conveyor belt, chute, door, bay, feeder truck, package car, or any location or moving link along a path toward the destination of the parcel 200.

The display 62 may be selected to match the indicia 30 for each particular parcel 200. In one embodiment of the present invention, the system 10 may include one or more projectors 60 configured to project multiple selected displays 62 onto the surfaces of multiple parcels 200 simultaneously. The projector 60 or projection system may be provided that is capable of projecting the selected display 62 onto each one of several parcels 200 as they approach the viewer 400. By viewing multiple displays 62 on approaching parcels 200, the viewer 400 may gain valuable insight into the upcoming tasks to be performed, increasing efficiency and saving valuable time.

4. System Tasks

Figure 5:
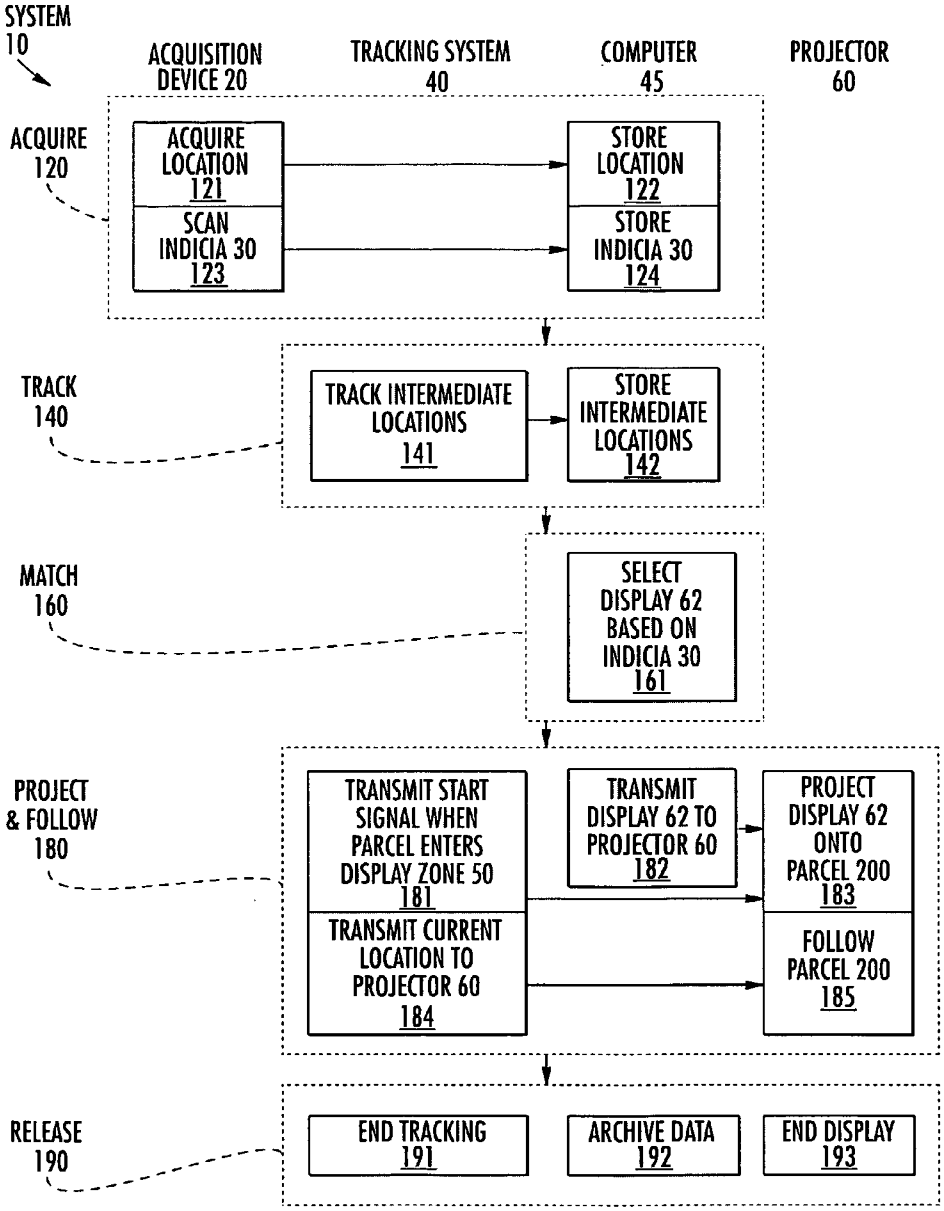
FIG. 5 is a flow chart illustrating a series of tasks accomplished in a tracking and display system, according to one embodiment of the present invention.

In one embodiment, the system of the present invention may include methods and apparatuses to accomplish the general tasks shown in FIG. 5 for each item or parcel 200 of interest: acquire 120, track 140, match 160, project and follow 180, and release 190. In FIG. 5, the column headings show the device or system that may be used to accomplish a particular task. The tasks of acquiring the parcel location 121 and acquiring or scanning the indicia 30 (task 123) appear in the first shaded column and therefore may be performed by the acquisition device 20. The tasks may be executed in order, generally, although the track task 140 and the match task 160 may occur in either order or simultaneously. The "project and follow" task 180 generally includes both the projection of a display 62 and the following of the parcel 200, because the display 62 must follow the parcel 200 in order to remain visible. After a parcel 200 has been processed or handled according to the instructions in the display 62, the release task 190 may include the end of active tracking and display and the archiving of the data gathered.

In one embodiment, the system of the present invention may accomplish the general tasks shown in FIG. 5 for a multiple items or parcels 200 simultaneously. In other words, the tasks—acquire 120, track 140, match 160, project and follow 180, and release 190—may be accomplished, for example, on every parcel 200 in an incoming flow of singulated or non-singulated parcels to be processed.

4.1 Acquire

Referring to the flow chart of tasks in FIG. 5, the acquire task 120 may be accomplished by an acquisition device 20. In one embodiment, an acquisition device 20 may acquire, capture, scan, or otherwise read a label or indicia 30 (task 123) on each of one or more parcels 200. As shown in FIG. 2, each parcel 200 may include a label or other indicia 30. The indicia 30 may include a code such as a unique parcel identifier that may be used to differentiate the parcel from the others. The indicia 30 read by the acquisition device 20 may be transmitted to a computer 45 and stored (task 124) in memory such as a database 80 for processing and later retrieval. In one embodiment, for each one of a plurality of parcels 200, the computer 45 may receive and store a scan of the indicia 30, and one or more fields for storing the data contained in the indicia 30.

The indicia 30 may be a bar code, maxi-code, UPC symbol, RFID tag, text readable an optical character recognition (OCR) scanner, or any component capable of holding a parcel identifier. In one embodiment, the acquisition device 20 captures the data encoded or otherwise embedded within the indicia 30 by scanning, optically reading, or otherwise acquiring the data (track 123). The acquisition device 20 may be an image camera, a bar code reader, an optical scanner, an optical character recognition (OCR) scanner, an RFID reader, or any system capable of reading or otherwise obtaining a parcel identifier from the particular indicia 30 in use. In one embodiment, the acquisition device 20 may be specifically chosen or tailored to read or capture data from a particular type of indicia 30.

In one embodiment, an acquisition device 20 may acquire or capture an initial location (task 121) for each one of a plurality of parcels 200. The location data may include all three dimensions (x, y, z) and a time of acquisition. In addition, the acquisition device 20 may be configured to measure the dimensions of each item or parcel 200, and its orientation relative to known coordinates. In another embodiment, a tracking system 40 may measure the parcel 200 and its location. The data gathered for all the parcels 200 by the acquisition device 20 may be transmitted to a computer 45 and stored (task 122) in memory such as a database 80 for processing and later retrieval.

4.2 Track

Once the acquire task 120 is completed, the tracking cameras 42, as shown in FIG. 2, may cooperate as part of a tracking system 40 to monitor the intermediate locations of each parcel 200 at various intermediate times (task 141). The group of parcels 200 may be propelled or moved along a fixed or random path by one or more conveyors 100 or handling systems. In one embodiment, one or more tracking systems 40 may work together to continually monitor and update the location of each parcel 200 (track task 140). The tracking systems 40 may fix a position, for each one of a plurality of parcels 200, at a plurality of interim locations and corresponding times. A parcel number or other unique identifier may be used to enable the tracking system 40 to track multiple parcels simultaneously.

The intermediate location data gathered by the tracking system 40 (task 141) may be transmitted to a computer 45 and stored in a database 80 for processing and later retrieval. In one embodiment, for multiple parcels 200, the computer 45 may receive and store each intermediate parcel location (task 142) including an acquire time, parcel dimensions (length, height, width, girth), and a parcel orientation relative to a known plane or coordinate system. In one embodiment, the system 10 of the present invention may include a grid or other type of established coordinate system superimposed upon a work area or facility, to be used by the system components to fix the locations relative to known reference points.

In one aspect of the invention, as shown in FIG. 2, the tracking cameras 42 and the one or more projectors 60 may be positioned to focus on each parcel 200 as it travels along its path. It should be noted that, although multiple physical obstacles may be present in a sorting facility, such as conveyor structures and building columns, the tracking systems 40 may be configured to continually monitor the location of multiple parcels 200. The system 10 may include a series of fixed, retro-reflective targets positioned throughout the facility to generate optical feedback signals to the tracking cameras 42 and to the computer 45. Data from the fixed targets may be used to keep the tracking cameras 42 and the projectors 60 properly oriented with respect to known locations in the facility. Location data gathered by the tracking system 40 and communicated to the computer 45 may be used by the projectors 60 to accurately project a legible display 62 onto the parcel 200 as it travels along its path.

In another aspect, the system 10 of the present invention in one embodiment may include a series of recognizable markers place on each worker or viewer 400 located in the work area or facility. The markers may include indicia unique to each viewer 400 to enable the system 10 to monitor the location of each viewer 400 and, in one embodiment, to monitor and/or minimize the viewer's exposure to scanning, tracking, or projecting energy.

In one embodiment, the tracking system 40 may include the system and components described in the commonly-owned U.S. patent application entitled, "Item Tracking and Processing Systems and Methods," invented by Anderson and Ramsager, filed Jan. 23, 2004, and assigned application Ser. No. 10/763,440, which is incorporated herein by reference in its entirety.

In one embodiment, the tracking system 40 of the present invention may include a motion tracking system such as the type available from Intelligent Video Systems or Epix, Inc. The tracking system 40, in one embodiment, may include one or more fixed, perspective-view cameras and one or more movable dome cameras. The tracking cameras 42 may be positioned and calibrated using methods known in the art of object tracking. The tracking cameras 42 may include both fixed and movable, pan-and-tilt cameras, which may be positioned in a prescribed array or matrix or may be placed randomly at strategic locations.

In one embodiment, the tracking system 40 may include a tracking computer specially configured to direct and control the tracking cameras 42 and other components of the tracking system 40. The tracking computer may include a tracking engine or other software particularly suited for tracking multiple objects or parcels 200, performing telemetry calculations, processing video images, calculating the positions of moving objects, and the like. Like the system computer 45, the tracking computer may include one or more databases to store data about each item or parcel 200 being tracked. To facilitate the exchange of data, the tracking computer may be in communication with the system computer 45.

The data gathered by the tracking system 40 may be transmitted via a link (shown in FIG. 4) to a computer 45 and stored in a database 80 for processing and retrieval. In one embodiment, the computer 45 may receive and store a plurality of intermediate locations (in up to three dimensions, and including an intermediate time) for multiple parcels 200.

4.3 Match

Once the acquire task 120 is completed, the computer 45 may receive, store, and process the indicia 30 and the data contained therein. The indicia 30 may include data embedded in a label or other marking on each parcel 200. In one embodiment, the display 62 may be correlated to the indicia 30 on each parcel 200. When multiple parcels 200 are being processed together, the system 10 in one embodiment correlates each indicia 30 acquired from each parcel 200 and selects a particular display 62 for each parcel 200.

In one embodiment, a display 62 is selected based upon the data contained in the indicia 30 (task 161). In other words, the system 10 of the present invention matches (task 160) the appropriate display 62 to the particular parcel 200 being processed. The display 62 may also include a handling instruction 130 correlated to or specifically tailored for a particular parcel 200. The process of correlating or matching the indicia 30 (task 161) may be accomplished by the computer 45.

In one embodiment, the display 62 may include text, numerals, symbols, icons, arrows, or combinations thereof, designed to convey a message or handling instruction 130 to the viewer 400. The display 62 may include one or many colors. The display 62 may be minimal to convey simple instructions, or more complex and involved to convey complex or multiple instructions. For example, a display 62 may include a handling instruction 130 in the form of an abbreviation such as "TF" to instruct the viewer 400 to place a parcel 200 on a "Top Front" conveyor or shelf. Similarly, a numeral such as "15" may be used in the display 62 to instruct the viewer 400 to move a parcel to a location identified by the number fifteen, such as a conveyor belt, chute, door, bay, feeder truck, or package car. The handling instruction 130 may be a combination, such as "TF-15" indicating a "top front" position in or near location number fifteen.

In one embodiment, the system 10 of the present invention may include a standard set of displays or symbols. The display 62 selected may be one from the standard set. The standard set may include symbols or icons developed to convey special circumstances, from fault messages to special handling instructions. For example, a symbol indicating a failure to read the indicia 30 on the parcel label may be used to inform the viewer 400 that a parcel 200 is not being actively tracked. Other symbols may be developed to tell the viewer 200 to manually process a package; for example, to carry a parcel 200 by hand to a special handling location. The various symbols designed, in one embodiment, may be added to a standard set of displays. The projectors 60 in one embodiment are capable of processing and displaying a variety of icons in different shapes, sizes, and colors, in order to convey information to the viewer using symbols.

The display 62 may be transmitted to the projector 60 (task 182) as soon as the selection task is complete, or it may be transmitted later, such as when the item or parcel 200 enters a display zone 50. When multiple parcels 200 are being processed together, the selected display 62 for each parcel 200 may be transmitted to the projector 60 or projection system (task 182) for each and every parcel. Then, in one embodiment, the projector 60 may project the selected displays 62 onto each of the corresponding parcels 200 simultaneously, when the parcels 200 approach or enter the display zone 50.

4.4 Project & Follow

In one embodiment, the project and follow task 180 may begin when each item or parcel 200 approaches or enters nears a display zone 50, where each parcel 200 is generally handled or processed by a worker or viewer 400. A start signal may be transmitted (task 181) when the tracking system 40 senses a parcel 200 enter the display zone 50. Multiple start signals may be transmitted in circumstances where multiple parcels 200 are processed simultaneously.

In one embodiment, the projector 60 may be configured to project a display 62 adjacent or near a parcel 200 or directly onto a surface of a parcel 200 (task 183) and to follow the parcel 200 as it moves along its path (task 185). The 'following task' 185 may be accomplished, in one embodiment, using current location data received from the tracking system 40 (task 184).

In one embodiment of the present invention, the system 10 may include one or more projectors 60 configured to project multiple selected displays 62 simultaneously, onto the surfaces of each corresponding parcel 200 being processed (task 183). In this aspect, the viewer 400 may see multiple displays 62 on several approaching parcels 200, providing valuable insight into the upcoming tasks to be performed and saving valuable time. The projector 60 may illuminate a display 62 on each of several parcels 200 approaching a viewer 400 in a display zone 50. Seeing several displays 62 may allow the viewer 400 to understand the imminent tasks and plan ahead. For example, if two of the parcels 200 have a similar display 62, such as TF-15, the viewer 400 may process those two parcels together (by moving them both toward the location corresponding to the TF-15 display) and thereby save time and effort.

The system 10, in one embodiment, may use data gathered by the tracking system 40 and stored in the controller or computer 45 to calculate or derive the most visible surface of a parcel 200 relative to a viewer 400 standing or otherwise located in the display zone 50. In this embodiment, dimensional data about a parcel 200 may be used to calculate or derive the size and shape of one or more exterior surfaces. From these calculations, and given the position of a viewer 400 in or near the display zone 50, the system 10 of the present invention may direct the projector 60 to project the display 62 onto the exterior surface most visible to the viewer 400.

A display 62 and handling instruction 130 may be temporary; that is, lasting only as long as the instruction is helpful or, in other cases, as long as the parcel 200 is traveling along a known or knowable path 110 (FIG. 3). Once the instruction 130 is followed and the parcel 200 is handled accordingly, the need for such an instruction 130 may end. In one embodiment, the display 62 may be projected when a parcel 200 nears or enters a display zone 50, and the display 62 may follow the parcel 200 until it leaves the display zone 50. A display zone 50 may be established around an area where one or more workers or viewers 400 may desire or benefit from viewing the display 62 being projected onto each parcel 200. In one embodiment, a display zone 50 may be described with reference to a fixed location defined by known coordinates.

The projector 60 selected for the system 10 of the present invention may vary in complexity from a simple spotlight or slide projector to a more complex graphics projector or laser projection system. In one embodiment, the handling instruction 130 portion of the display 62 may simply direct the viewer 400 to grasp or pick a parcel 200 or let it continue on its path. For such a system, the projector 60 may be a simple spotlight configured to illuminate each selected parcel 200 and leave the non-selected parcels dark. In other embodiments, where a more complex handling instruction 130 may be needed to assist the viewer 400 in deciding among multiple options, the display 62 may require more detail and thus, may require a more complex projector 60. The projector 60 or projection system, in one embodiment, may project different displays 62 onto multiple items or parcels 200 simultaneously.

In one embodiment, the projector 60 of the present invention may include a laser projection system such as the one available from Laser Projection Technologies. For a laser projection system, the tracking system 40 in one embodiment may include a series of retro-reflective targets positioned to generate optical feedback signals that help keep the projector 60 properly oriented. The projector 60 may also include software to read and convert legible data (such as symbols, text, or other indicia) into a traced laser pattern for the display 62. The task of matching or correlating the indicia 30 on each parcel 200 to a particular display 62, as described above, will generally produce a display 62 (text, icon, symbol, or combinations thereof) which may be converted into a pattern to be traced by the laser beam in order to produce a visible display 62 on each parcel 200. A laser projection system may be generally capable of projecting different displays 62 onto multiple items or parcels 200 simultaneously. In another aspect, the projector 60 of the present invention may include a laser projector such as the one available from Lightspeed Design Group. The projector 60 in one embodiment may include both a laser and a graphics projection system to control the color, polarization, and collimation of the laser beam.

The projector 60, as shown in FIG. 2, may be configured to project a display 62 onto one or more of the outer surfaces of each parcel 200. The display 62 may include a handling instruction 130. In one embodiment, the display 62 may be correlated or matched to the indicia 30 on the parcel 200, as described above.

The one or more projectors 60 may also be configured, in one embodiment, to follow each parcel 200 along a moving path (task 185), so that the handling instruction 130 remains legible to one or more viewers 400. By "follow the parcel" it is meant that the projectors 60 may rotate or otherwise move from a generally fixed position so that the projected display 62 remains pointed toward the parcel 200 (or each of several parcels 200 simultaneously) and each display 62 remains generally legible to a viewer 400. In one embodiment, each projector 60 may be configured to move, along a track for example, in order to maintain the legibility of the projected display 62. In one embodiment, the system 10 may be configured to move or rotate the projector 60 in tandem with the parcel 200, so the display 62 remains near or moves in conjunction with the parcel 200. Where multiple parcels 200 are being processed, the system 10 in one embodiment may be configured to move or rotate one or more projectors 60 in tandem with the parcels 200, so that each display 62 remains near or moves in conjunction with each corresponding parcel 200.

In one embodiment, the display 62 including any handling instruction 130 may be sized and shaped by the projector 60 to fit neatly upon one of the outer surfaces of each parcel 200. The acquisition device 20 and/or the tracking system 40 may acquire various measurements of each parcel 200 (task 121) and return the size data to the computer 45 (task 122). The size and shape of each selected display 62 and handling instruction 130, of course, may change as each parcel 200 travels along a path or otherwise changes its orientation or pose with respect to the projector 60. The system 10 in one embodiment may calculate the desired change for each display 62, and the corresponding motion of each projector 60, to accurately follow each moving parcel 200 in a group of multiple parcels 200.

The projector 60 may also be configured to project the display 62 onto the surface best suited to receive the display and exhibit the display 62 to a viewer. For example, the projector 60 may project the handling instruction 130 onto the top of a parcel 200 passing directly beneath the projector 60, whereas the display 62 and handling instruction 130 may be projected on the side of another parcel 200 depending in part on the position of the projector 60.

Display of the same display 62 on multiple surfaces of the same parcel 200 may also be accomplished in one embodiment because one or more viewers 400 may need to see a handling instruction 130 from different viewpoints. Display of the handling instruction 130 onto a surface separate from, yet related to, the parcel 200 may also be accomplished in one embodiment. For example, for very small or flat parcels, a vertical placard or other screen surface may be attached or otherwise linked to a parcel 200 to receive the projected display 62.

In one embodiment, the parcel 200 may include one or more labels or surfaces specially coated to produce a permanent instruction when it receives a display 62. In the case of a laser projection system, for example, a paper label may be used with ink that responds to laser light in such a way that a permanent instruction becomes visible. Other tags or devices capable of storing information received from a projected display 62 may accompany the parcel 200.

4.5 Release

In one embodiment, the system 10 of the present invention may be configured to release each parcel 200 (task 190) when it has been processed. The release task 190 may include ending the active tracking of each parcel 200 (task 191), archiving or clearing the data stored in the computer 45 (task 192), and/or ending the active projection of the display 62 (task 193). In general, the system tasks are complete when each parcel 200 has been processed or otherwise handled by a viewer 400 who may move the parcel 200 to a next particular segment 500 according to the handling instruction 130 included or understood within the display 62. The release task 190 for a group of parcels may be performed at different times, of course, when each parcel 200 has been processed.

The system 10 in one embodiment may be used in conjunction with other systems 10 in a series of related segments 500 in a work area or facility. For example, after a first system 10 has released a parcel 200 (task 190), a second system may acquire the parcel (task 120) and begin the process anew for another link or segment in a chain or series of item processing steps.

5. Tracking Parcel Contents

The system 10 of the present invention may have applicability beyond the sorting or processing of items or parcels 200. Existing packaging facilities may use a "pick to light" system that is programmed to illuminate a light near a bin containing an item to be placed in a package. As the packer moves through a facility, additional lights are illuminated near the next item to be packed. The system may also include a display near the bin to indicate the quantity of items to be packed. Selection and packing of an item may be acknowledged by pressing a button near the bin. In use, this type of system requires extensive and complex electrical wiring that must be installed throughout the facility before packing work can begin.

In another aspect of the present invention, a projection system 10 according to one embodiment may include one or more tracking systems 40 and projectors 60 to display a handling instruction 130 in the form a packing instruction or packing list onto a parcel 200 to be filled with items. The projectors 60 may also display a series of item names and quantities onto the parcel 200, in order to provide real-time instruction to the person picking the items and packing the parcel. In one embodiment, the projectors 60 may display the next item instruction along with one or more future instructions, to provide information in advance and further speed the packing process. Tracking systems 40 positioned in various locations throughout a facility may be configured to track each parcel 200 as it moves through different areas.

In one embodiment, the projectors 60 may also display a quantity indicator near the bin containing an item to be packed. As the tracking system 40 follows the parcels 200 through the facility, sending data to the computer 45, the projectors 60 may display the next quantity indicator on the next bin, and so forth. The projection system 10 may include a bar code scanner or other sensors to confirm the correct selection and packing of each item. In general, the overhead tracking system 40 and projectors 60 may provide a flexible and simple alternative to the hard-wired lights and switches of a traditional "pick to light" system.

Like the system 10 illustrated in FIG. 4, the system 10 of this embodiment of the present invention may included a computer 45 linked to one or more scanners or acquisition devices 20, tracking systems 40, and projectors 60. An acquisition device 20 may include a scanner to optically read the packing list data embedded within the indicia 30 on a label placed on an empty parcel 200 to be filled. The acquisition device 20 may then transmit the data embedded in the indicia 30 to the computer 45. The tracking system 40 and tracking cameras 42 may follow the parcel 200 through the facility, so that the computer 45 always has current location data for the parcel 200 relative to the known locations of certain bins filled with items. The projectors 60 in this embodiment may project a display 62 including packing instructions 103 onto the parcel 200 and/or onto the bins, as required, to increase packing efficiency. Many of the same advantages gained from projecting a handling instruction 130 onto a parcel 200 can be realized in the context of projecting a packing instruction.

6. Conclusion

The described embodiments of the invention are intended to be merely exemplary. Numerous variations and modifications will be apparent to those skilled in the art. All such variations and modifications are intended to fall within the scope of the present invention as defined in the appended list of exemplary inventive concepts.

What has been described above includes several examples. It is, of course, not possible to describe every conceivable combination of components or methodologies for purposes of describing the systems, methods, computer readable media and so on employed in planning routes. However, one of ordinary skill in the art may recognize that further combinations and permutations are possible. Accordingly, this application is intended to embrace alterations, modifications, and variations that fall within the scope of the appended list of exemplary inventive concepts. Furthermore, the preceding description is not meant to limit the scope of the invention. Rather, the scope of the invention is to be determined only by the appended list of exemplary inventive concepts and their equivalents.

While the systems, methods, and apparatuses herein have been illustrated by describing examples, and while the examples have been described in considerable detail, it is not the intention of the applicants to restrict or in any way limit the scope of the appended list of exemplary inventive concepts to such detail. Additional advantages and modifications will be readily apparent to those skilled in the art. Therefore, the invention, in its broader aspects, is not limited to the specific details, the representative systems and methods, or illustrative examples shown and described. Accordingly, departures may be made from such detail without departing from the spirit or scope of the applicant's general inventive concepts.

What is claimed is:

1. A system for processing one or more items, comprising:

an acquisition device to capture indicia about an item moving along a path generally toward a display zone;

one or more projectors positioned near said display zone where said item may be processed;

a tracking system to capture a plurality of locations and corresponding times for said item, said tracking system comprising one or more tracking cameras, wherein each of said plurality of locations comprises item coordinates relative to an established system of coordinates, an angular orientation relative to said established system of coordinates, and dimensional data about said item; and a controller in communication with said acquisition device, said tracking system, and said one or more projectors, wherein said controller receives said indicia from said acquisition device, selects a display based upon said indicia, and sends said display to said one or more projectors positions to project said display adjacent said item, wherein said controller is further configured to:

receive said plurality of locations and corresponding times;

compare said item coordinates to a fixed location of said display zone; and send a start signal to said one or more projectors when said item coordinates fall within said fixed location of said display zone, said start signal configured to prompt said one or more projectors to project said display.

2. The system of claim 1, wherein said indicia comprises an optical code and said acquisition device comprises an optical scanner.

3. The system of claim 1, wherein said indicia comprises a bar code and said acquisition device comprises a bar code scanner.

4. The system of claim 1, wherein said indicia comprises an RFID tag and said acquisition device comprises an RFID reader.

5. The system of claim 1, wherein said one or more projectors is positioned to project said display onto one or more exterior surfaces of said item.

6. The system of claim 1, wherein said one or more projectors is configured to select a most visible surface relative to a viewer located within said display zone, and wherein said one or more projectors is positioned to project said display onto said most visible surface.

7. The system of claim 1, wherein said one or more projectors comprises a laser projection system.

8. The system of claim 1, wherein said controller comprises a computer with memory and a database for storing said indicia.

9. The system of claim 1, wherein said display is configured to communicate a handling instruction to a viewer of said display.

10. The system of claim 1, wherein said display is selected from a set of standard displays.

11. The system of claim 1, wherein said controller is further configured to:

select as a current location the most recent one of said plurality of locations;

direct said one or more projectors to project said display adjacent said item at said current location, such that said display follows said item along said path.

12. The system of claim 1, wherein said controller is further configured to:

select as a current orientation the most recent one of said angular orientations;

direct said one or more projectors to project said display adjacent said item at said current orientation, such that said display follows said item along said path and remains legible.

13. A method of processing a plurality of items, comprising:

(a) acquiring indicia about an item selected from a plurality of items moving along a path generally toward a display zone having a fixed display location relative to an established system of coordinates;

(b) capturing a plurality of item locations and corresponding times for said item, wherein each of said plurality of item locations includes item coordinates and an angular orientation relative to said established system of coordinates;

(c) selecting a display based upon said indicia;

(d) projecting said display adjacent said item by comparing a current set of said item coordinates to said fixed display location and sending a start signal to initiate said display when said current set of item coordinates falls within said fixed display location; and (e) repeating steps (a) through (d) for a subsequent item selected from said plurality of items.

14. The method of claim 13, wherein said step of acquiring indicia further comprises providing an acquisition device configured to read said indicia.

15. The method of claim 13, wherein said step of projecting said display further comprises:

projecting said display onto one or more exterior surfaces of said item.

16. The method of claim 13, wherein said step of projecting said display further comprises:

selecting a most visible surface relative to a viewer located within said display zone; and projecting said display onto said most visible surface.

17. The method of claim 13, further comprising:

projecting one or more of said displays simultaneously.

18. The method of claim 13, wherein said step of projecting said display further comprises:

communicating a handling instruction to a viewer of said display.

19. The method of claim 13, wherein said step of selecting a display further comprises:

providing a set of standard displays; and selecting said display from said set.

20. The method of claim 13, wherein said step of capturing an item location further comprises:

capturing one or more intermediate locations of said item as it moves along a path generally toward a display zone;

storing each of said one or more intermediate locations;

selecting as a current location the most recent one of said one or more intermediate locations;

comparing said current location to a fixed location of said display zone; and executing said step of projecting said display when said current location falls within said fixed location of said display zone.

21. The method of claim 20, wherein said step of capturing an item location further comprises:

projecting said display adjacent said item at said current location, such that said display follows said item along said path and remains legible.

* * * * *

UNITED STATES PATENT AND TRADEMARK OFFICE

CERTIFICATE OF CORRECTION

PATENT NO. : 7,090,134 B2
APPLICATION NO. : 10/793045
DATED : August 15, 2006
INVENTOR(S) : Ramsager It is certified that error appears in the above-identified patent and that said Letters Patent is hereby corrected as shown below:

Column 1,
Line 54, "user" should read --use--.

Column 5,
Line 8, "product" should read --produce--.

Column 6,
Line 9, "non-singlulated" should read --non-singulated--.

Column 9,
Line 19, "track" should read --task--.

Column 10,
Line 22, "place" should read --placed--.

Column 15,
Line 27, "included" should read --include--.

Signed and Sealed this

Sixteenth Day of January, 2007

JON W. DUDAS
*Director of the United States Patent and Trademark Office*